(No Model.)
A. J. BLACKFORD.
REVOLVING SHOW CASE.
No. 362,814. Patented May 10, 1887.
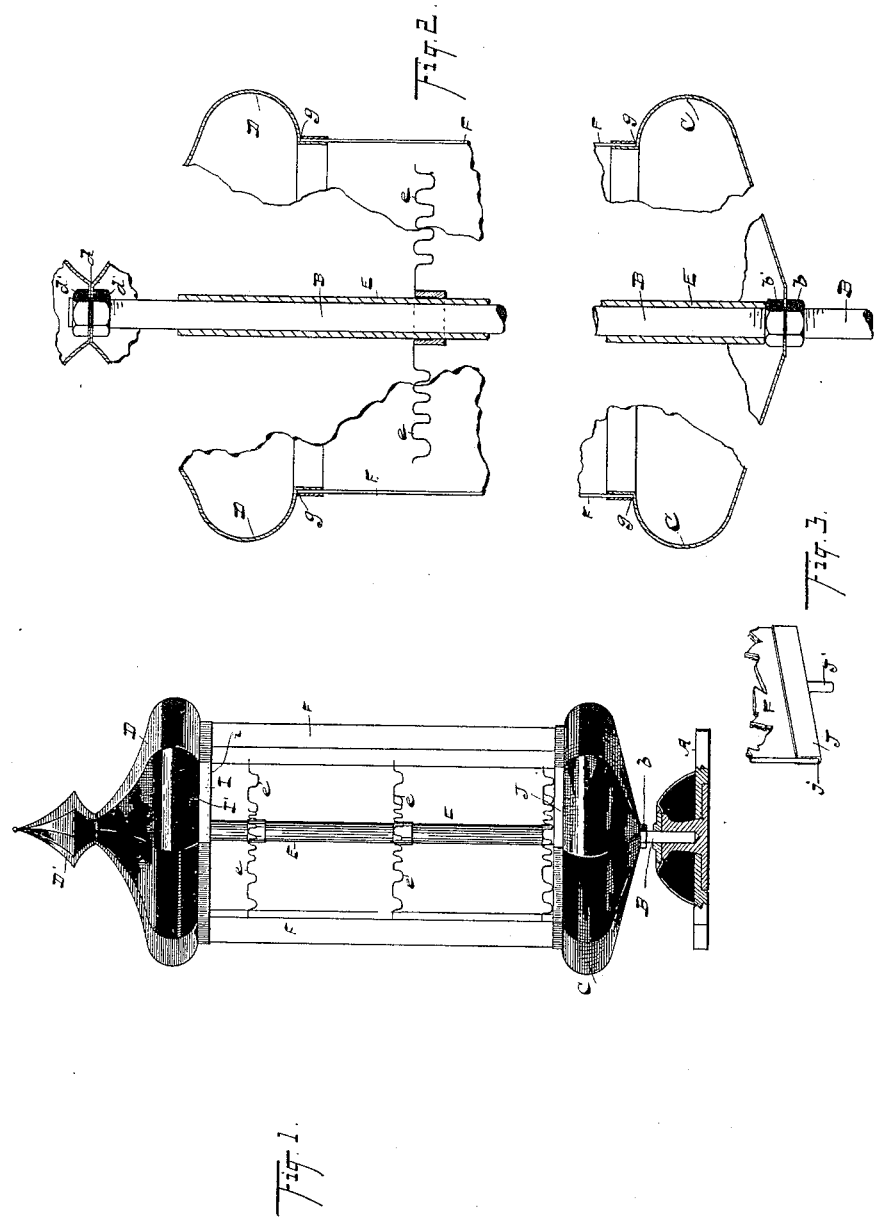
WITNESSES
INVENTOR
Atwell J. Blackford
By Leggett & Leggett
Attorney

UNITED STATES PATENT OFFICE.

ATWELL J. BLACKFORD, OF MEDINA, OHIO.

REVOLVING SHOW-CASE.

SPECIFICATION forming part of Letters Patent No. 362,814, dated May 10, 1887.

Application filed February 8, 1887. Serial No. 226,929. (No model.)

*To all whom it may concern:*

Be it known that I, ATWELL J. BLACKFORD, of Medina, in the county of Medina and State of Ohio, have invented certain new and useful Improvements in Revolving Show-Cases; and I do hereby declare the following to be a full, clear, and exact description of the invention, such as will enable others skilled in the art to which it pertains to make and use the same.

My invention relates to a revolving show-case in which the sides are of glass without support, except at the top and bottom, with arms and suitable mechanism for attaching goods, said arms being made to revolve independent of the case, to the end that the arms may be revolved to attach or remove articles through a detachable side of the case while the case remains stationary, or the arms and case may be revolved together to show off the goods.

In the accompanying drawings, Figure 1 is a side elevation of my improved device, the supporting-base being shown in section. Fig. 2 is an enlarged elevation, portions being broken away to show the construction. Fig. 3 is a view in detail of one end of the swinging door.

A represents the supporting-base, the same having a vertical central bore, in which is journaled the upright spindle B, the bottom of the base forming a stepping for the spindle, as shown in Fig. 1.

C and D are respectively the base and top of the show-case. These are usually of thin sheet metal, brazed, soldered, or otherwise secured together at the angles, and the outer surfaces polished and plated. A central hole made through the base C fits over the spindle B, and the latter is provided with nuts $b$, respectively above and below the wall of the base, and these are screwed tight against the latter, so that the base C is held firmly and made to revolve with the spindle B. Next in the order of assembling the parts, a sleeve or tube, E, is placed upon the spindle. This tube rests on the nut or collar $b'$, or on an intervening washer, if preferred, the tube being made to revolve freely on the spindle. To the tube E are attached any number of lateral arms $e$, these being arranged usually in sets at different elevations, and the arms may be provided with hooks, clasps, or other devices for conveniently attaching articles. The cap D at $d$ fits the spindle, and the latter has nuts $d'$, arranged as shown in Fig. 2, to hold the cap in place, the base C, cap D, and spindle B thus forming a rigid structure that revolves by the spindle turning in the base A. The ornamental top D' of the cap is made detachable, to give access to the top nut or collar, $d'$, a slip-joint being all that is required to hold the part D' in place.

Glass plates F form the sides of the show-case, and these are set in grooves $g$, made, respectively, in the base and cap, as shown in Fig. 2. The glass plates are fitted neatly together at the angles, and require no standards or other supports other than had, as aforesaid, at the top and bottom.

The absence of posts or standards at the corners adds greatly to the beauty of the structure. One plate of glass serves as a door, and is made to move on pivots arranged at the top and bottom midway of the door. For this purpose are provided bars I and J, with grooves $i$ and $j$, for receiving the respective ends of the glass, the latter being cemented in these grooves, the said bars being provided with teats or pivotal bearings I' and J'. These teats or points are pivoted, respectively, in the base C and cap D. By pressing against one edge of the door it is made to turn on its pivotal bearing, thus opening the door and giving access to the inside of the case. The show-case is easily revolved with the spindle to show off the goods, and by opening the door and while the case remains stationary the system of arms may be revolved to bring any article next the door. These valuable features are believed to be novel in this class of show-cases.

What I claim is—

1. In a revolving show-case, the combination, with the base having a grooved upper edge, a cap having a grooved lower edge, and glass plates, the ends of which are secured in said grooves, of the upright spindle journaled in a supporting-base and connected to the cap and base, and an elongated sleeve loosely mounted on the spindle and provided with a series of arms, substantially as described.

2. In a revolving show-case, the combination, with a cap and base of the case, each made fast to an upright spindle, of grooves made in the cap and base to hold the glass plates that form the sides of the case, said plates being made to abut each other at the angles and without other fastening than that aforesaid at the top and bottom, substantially as set forth.

3. In a revolving show-case, the combination, with the rotary spindle stepped in a suitable bearing and the base and cap of the case, of a set of glass plates held between said base and cap, and the glass door stepped in the cap and base and adapted to swing therein, substantially as set forth.

In testimony whereof I sign this specification, in the presence of two witnesses, this 20th day of January, 1887.

ATWELL J. BLACKFORD.

Witnesses:
STEPHEN EWING,
C. D. FREEMAN.